US006997431B2

(12) United States Patent
Yuan

(10) Patent No.: US 6,997,431 B2
(45) Date of Patent: Feb. 14, 2006

(54) CHILDPROOF VALVE FOR SWIMMING POOL

(75) Inventor: Kuang Cheung Yuan, Longjiang (CN)

(73) Assignee: Aqua-Leisure Industries, Inc., Avon, MA (US)

( * ) Notice: Subject to any disclaimer, the term of this patent is extended or adjusted under 35 U.S.C. 154(b) by 85 days.

(21) Appl. No.: 10/378,542

(22) Filed: Mar. 3, 2003

(65) Prior Publication Data

US 2004/0173766 A1 Sep. 9, 2004

(51) Int. Cl.
*F16K 31/50* (2006.01)

(52) U.S. Cl. ........................... 251/96; 251/264; 4/490; 4/507; 210/416.2

(58) Field of Classification Search .................. 251/95, 251/96, 264; 4/490, 507; 210/416.2
See application file for complete search history.

(56) References Cited

U.S. PATENT DOCUMENTS 2,234,052 A * 3/1941 Luenz ......................... 251/95
3,210,040 A * 10/1965 Thurlow ...................... 251/96
3,929,150 A * 12/1975 Flinner et al. .............. 137/218
5,513,831 A * 5/1996 Seward ........................ 251/96
5,671,904 A * 9/1997 Minutillo ..................... 251/96
5,741,003 A * 4/1998 Segien, Jr. ................... 251/95
6,679,473 B1 * 1/2004 Ball ........................... 251/96

* cited by examiner

*Primary Examiner*—Eric Keasel

(57) ABSTRACT

Disclosed herein is a childproof valve for a swimming pool. In one embodiment, the valve may include a valve body having an inlet and an outlet and a flow-passage extending therebetween, a plunger movable within the valve body between closed and open positions to either close or open the flow-passage, a tap mounted to the valve body, and a clutch device interposed between the tap and the plunger and co-operating with the tap such that rotation of the tap will not move the plunger unless the tap is first moved axially.

6 Claims, 4 Drawing Sheets

56 10 11 12 13 14 21 17 6 15 16 6 8 9 7 24 20 18 19 F 5 52 50

CHILDPROOF VALVE FOR SWIMMING POOL

BACKGROUND

Water in an above-ground swimming pool is recirculated by a pump for filtration. It is sometimes necessary to undertake maintenance on the filter or the pump. If the pump and filter are lower than the pool water level, it is advisable to close a valve in each of the draw pipe and return pipe prior to removal of the filter or the pump, to prevent unwanted drainage of the pool. Similarly, if the filter and pump are located higher than the pool water level, the valves should be closed to prevent drainage of the filter and pump, as many pumps can be damaged if they are run unprimed.

To prevent such damage, close-off valves are commonly provided in the draw and return pipes connecting the pump and filter to the pool. It is important that these valves are not closed during operation of the pump, as the pump or the pipes themselves could be damaged by excessive back-pressure. However, above-ground swimming pools are often used by children, and inquisitive or naughty children might be tempted to play with the valve taps.

SUMMARY

Disclosed herein a is childproof valve for a swimming pool. As used herein, the word "childproof" is intended to convey the idea of presenting difficulty to a child, not necessarily absolute prevention.

In one exemplary embodiment, the childproof valve may comprise a valve body having an inlet and an outlet and a flow-passage extending therebetween, a plunger movable within the valve body between closed and open positions wherein the flow-passage is either closed or opened thereby, a tap mounted to the valve body, and a clutch device interposed between the tap and the plunger, the clutch device co-operating with the tap such that upon axial displacement of the tap, rotational motion of the tap is selectively converted to axial motion of the plunger between the closed position and the open position.

In another exemplary embodiment, the plunger may be substantially cylindrical and may comprise a thread to effect axial movement of the plunger upon rotation thereof by the clutch device.

In another exemplary embodiment, the plunger may be situated within an elbow of the valve body.

In another exemplary embodiment, there may be an intermediate member co-operating with the clutch device and being substantially cylindrical and comprising thread co-operating with the thread of the plunger.

In another exemplary embodiment, the clutch device may comprise a plurality of radially extending arms and the intermediate member comprises a plurality of radially extending slots into which the arms can be received. Alternatively the intermediate member comprises a plurality of radially extending arms and the clutch device comprises a plurality of radially extending slots into which the arms can be received.

In another exemplary embodiment, the clutch device may comprise a non-circular shaft to which the tap is attached.

In another exemplary embodiment, safety screen may be attached to the pipe.

In still another exemplary embodiment, the childproof valve may comprise a pipe having an inlet and an outlet; a plunger within the pipe, the plunger having a plunger thread and being movable between an open position and a closed position such that when the plunger is in the open position, water may flow through the pipe, and when the plunger is in the closed position, water flow through the pipe is blocked; an intermediate member having an intermediate member groove co-operating with the plunger thread; a tap mounted to the pipe; and a clutch plate, interposed between the tap and the intermediate member, having a shaft, wherein axial pressure on the tap causes the tap to engage the clutch plate via the shaft, causing the clutch plate to engage the intermediate member.

DESCRIPTION OF THE DRAWINGS

These and other features and advantages of the childproof valves disclosed herein will be more fully understood by reference to the following detailed description, in conjunction with the attached drawings in which like reference numerals refer to like elements through the different views. The drawings illustrate principles of the apparatus disclosed herein, and are not to scale.

DETAILED DESCRIPTION OF EXEMPLARY EMBODIMENTS

To provide an overall understanding, certain illustrative embodiments will now be described; however, it will be understood by one of ordinary skill in the art that the devices and methods described herein can be adapted and modified to provide devices and methods for other suitable applications and that other additions and modifications can be made without departing from the scope of the systems described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, specified, interchanged, and/or rearranged without departing from the disclosed devices or methods. Additionally, the shapes and sizes of components are also exemplary, and unless otherwise specified, can be altered without affecting the disclosed devices or methods.

In the accompanying drawings there is schematically depicted a valve 10, with parts typically fabricated from PVC plastics material. However, the parts could be brass, stainless steel, HDPE or any other suitable material known in the art of swimming pool plumbing fixtures.

Figure 1:
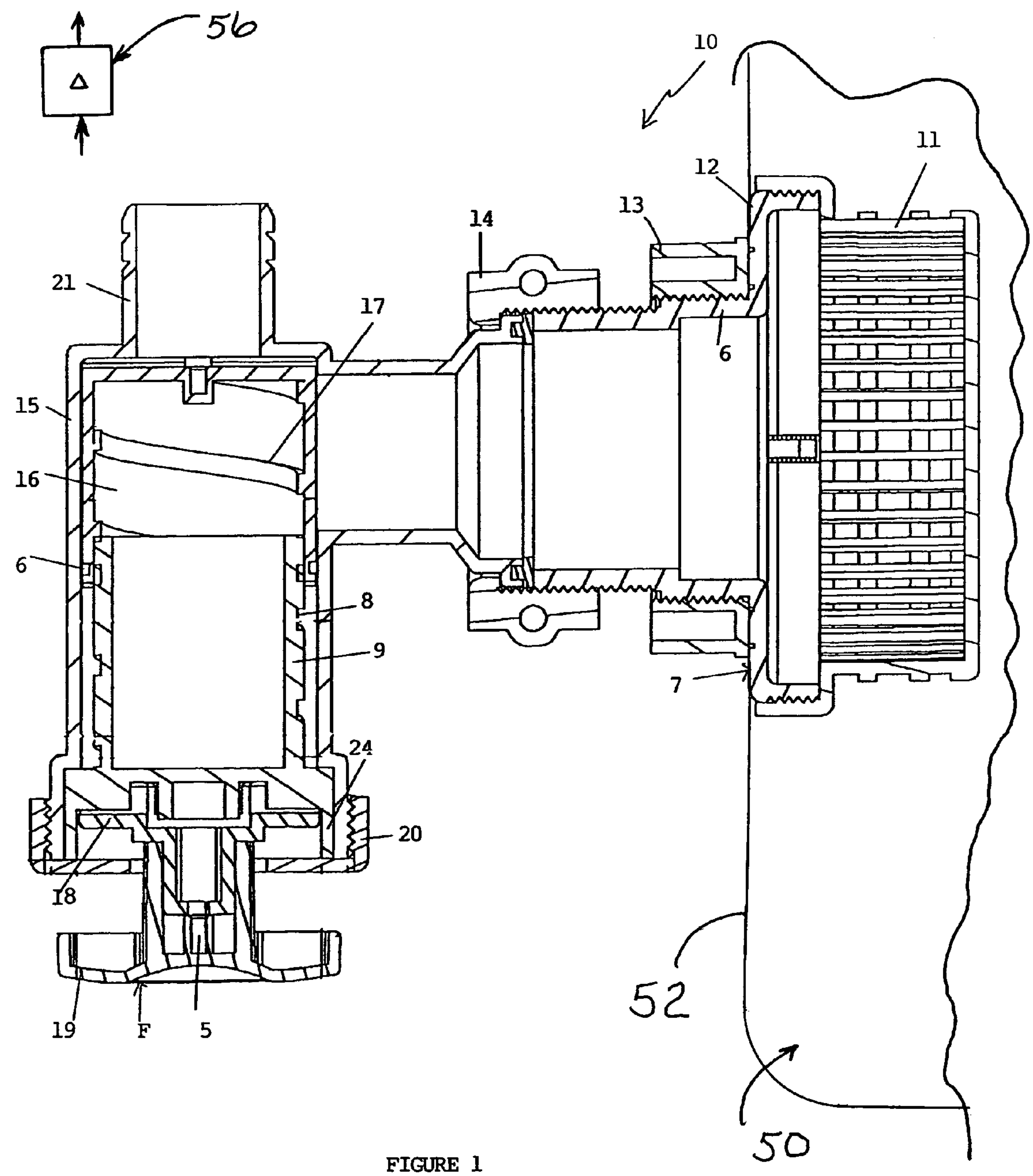
FIG. 1 is a schematic cross-sectional elevational view of an exemplary valve unit, shown with the valve closed.

Referring now to FIG. 1, the valve 10 comprises an elbow-shaped valve body 15 which may comprise extensions of circular cross-section. Attached to and inlet side of the valve body 15 is a pipe 12 that is externally threaded to receive a safety cage 11. Safety cage 11 may be positioned on the inside surface of a swimming pool wall. To this end, there may be provided a collar 13 having internal thread engaging with external thread on a narrower portion 6 of the pipe 12. The narrower portion 6 of the pipe 12 may pass through a hole in the swimming pool wall (not shown). The collar 13 may be tightened toward a shoulder 7 of the pipe 12, pinching the pool wall between the collar 13 and the shoulder 7, and securing the pipe 12 in place. There may be a retaining ring 14 through which any overhanging pool-lining material might pass.

The valve body 15 may include a port 21 from which a pipe may extend to a pump. The interior of port 21 and the interior of pipe 12 form a flow-passage that is (in the configuration depicted in FIG. 1) closed by a valve plunger 16.

In the illustrated embodiment, the plunger 16 is cylindrical, fitting smoothly within the valve body 15, and has a sealing ring 6 to seal against the inside surface of the valve body 15. The valve plunger 16 may include inwardly projecting thread 17, which in some embodiments may be a high pitch thread. In an exemplary embodiment, the thread 17 projects into the hollow interior of the valve plunger 16 as shown in the cutaway view of FIG. 1.

Figure 4:
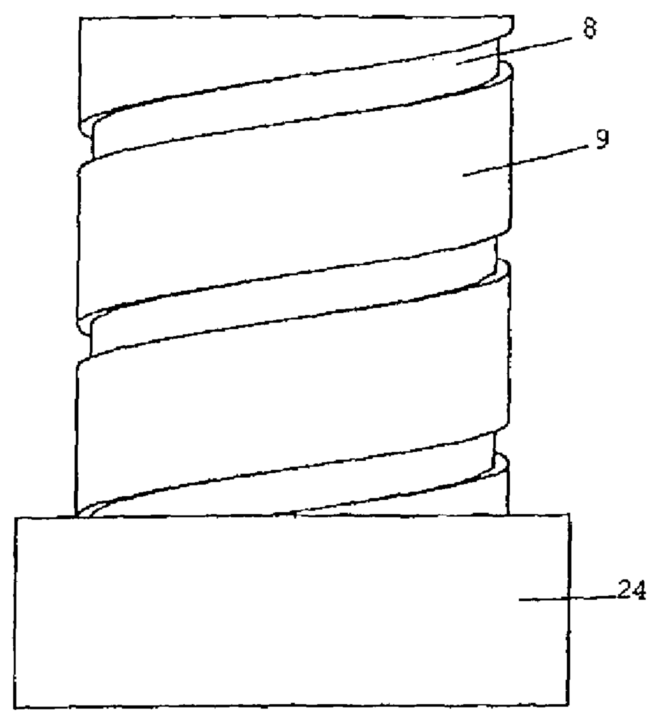
FIG. 4 is a schematic elevational view of an intermediate member.
Figure 5:
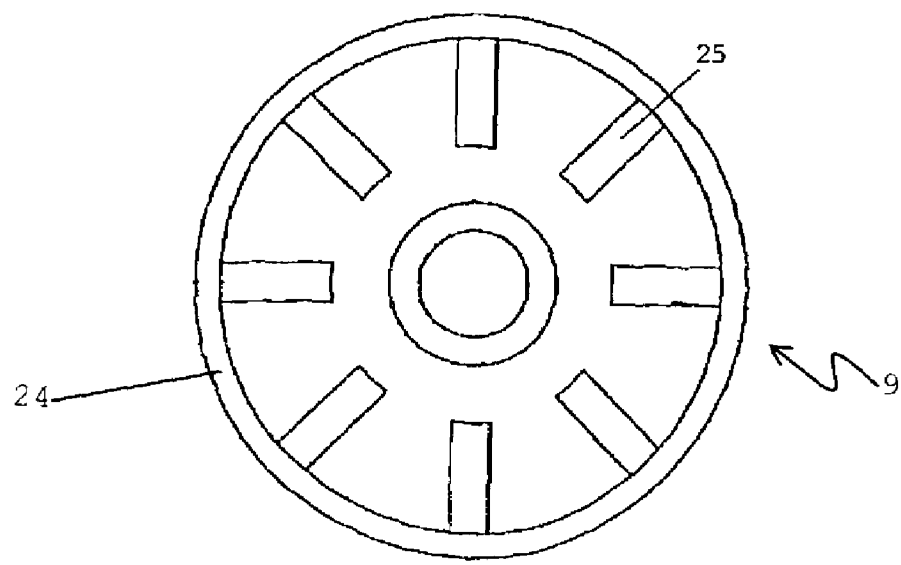
FIG. 5 is a schematic inverted plan view of the intermediate member of FIG. 4.

Extending from the valve plunger 16 is an approximately cylindrical intermediate member 9. The intermediate member 9 has a thread groove 8 to co-operate with the interior thread 17 of the valve plunger 16, as shown in FIGS. 1 and 4. In the illustrated embodiment, the intermediate member 9 may include a cowling 24 that surrounds a clutch plate 18. As shown in FIG. 5, there may be radially extending slots 25 formed in the underside of the intermediate member. Axial motion of the intermediate member 9 is restrained by a cap 20 and a shoulder 29 in the pipe 15. The intermediate member 9 is free to rotate, however, and upon rotation imparts axial translational motion to the plunger 16, via the cooperation of the thread groove 8 and the plunger internal thread 17. For example, the threads may be oriented so that right handed rotation of the intermediate member 9 advances the plunger 16, while left handed rotation causes the plunger 16 to retreat, or vice versa.

Figure 2:
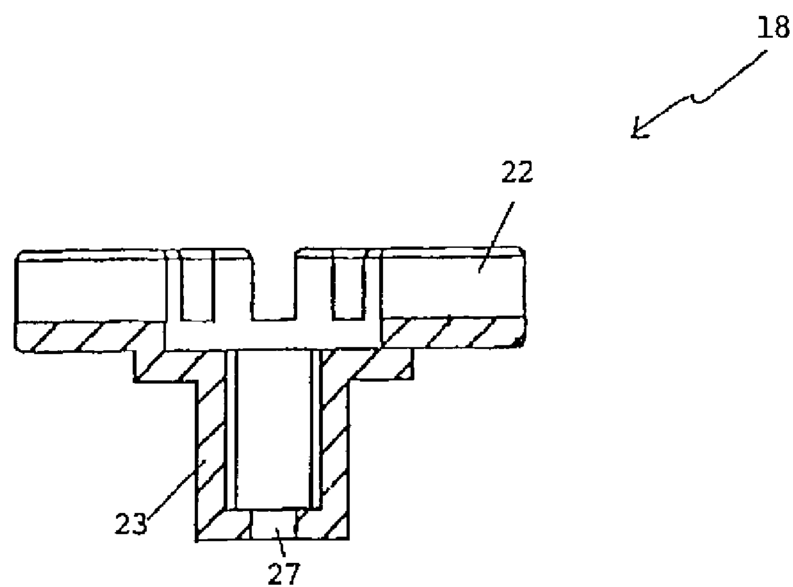
FIG. 2 is a schematic cross-sectional elevational view of a clutch.
Figure 3:
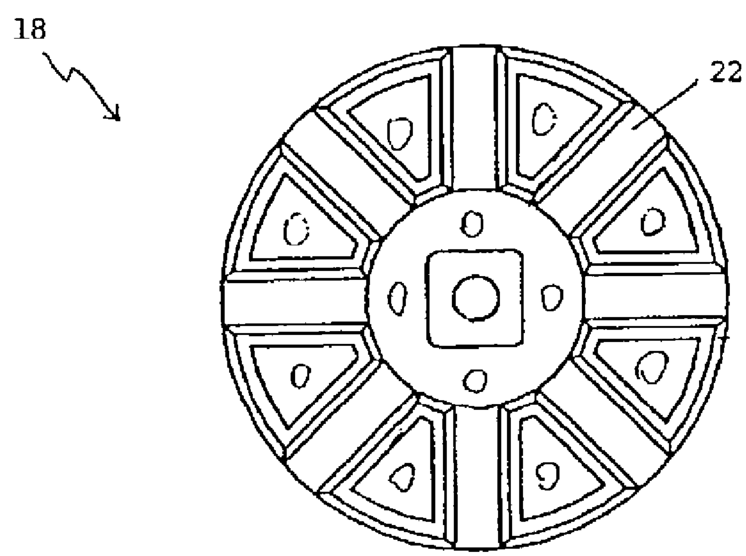
FIG. 3 is a schematic plan view of the clutch of FIG. 2.
Figure 6:
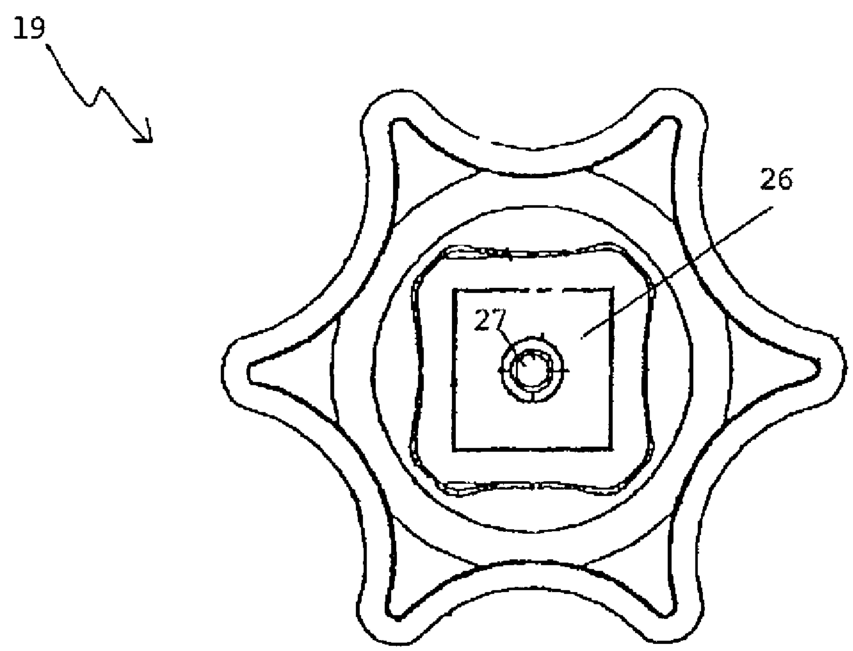
FIG. 6 is a schematic plan view of a tap.
Figure 7:
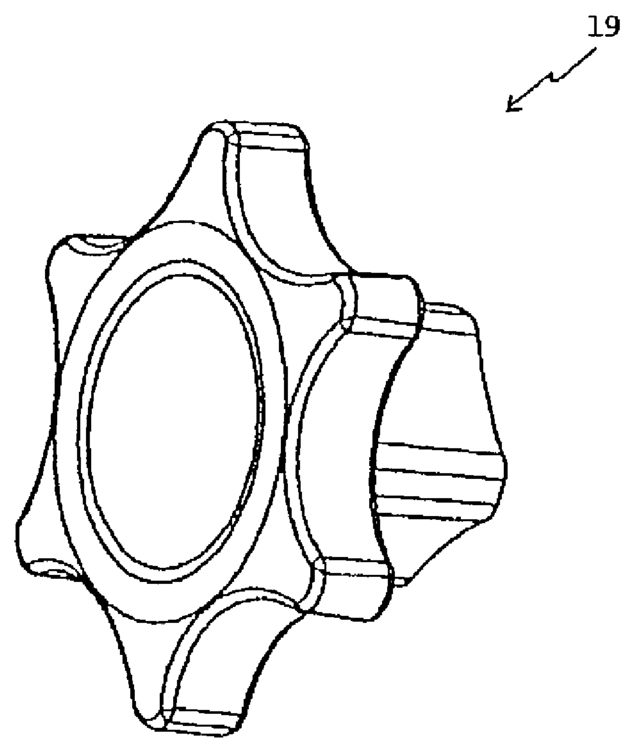
FIG. 7 is a schematic perspective illustration of the tap.

The clutch plate 18 may include a shaft 23 which may be of non-circular hollow cross-section. In the embodiment illustrated in FIG. 2, the cross-section of the shaft 23 is square. There is a screw hole 27 at the end of the shaft through which a screw can extend downwardly into a pre-formed hole 5 in a tap 19. The tap 19 is illustrated schematically in FIGS. 6 and 7. In an alternate embodiment, the shaft 23 may be integral with the tap 19 instead of with the clutch plate 18. In such an embodiment, there may be a screw hole at the end of the shaft through which a screw can extend upwardly into a pre-formed hole 5 in the clutch plate.

The clutch plate 18 is free to move vertically within the downwardly depending end portion of the valve body 15, but is constrained by a cap 20. In some embodiments, the cap 20 is threaded onto the valve body 15 as shown in FIG. 1. Alternatively, the cap may be affixed to the valve body via press fit, screws, bolts, or other suitable means.

In the position depicted in FIG. 1, an upward force F must be applied to the tap 19 so that the clutch plate 18 engages with the intermediate member 9. However, when the force F is not applied, gravity draws the tap 19 and the clutch plate 18 downwardly against the cap 20 to disengage the radial arms 22 from the radial slots 25. In such a position, rotation of the tap 19 and therefore the clutch 18, will not rotate the intermediate member 9.

When it is desired to open or close the valve, applying an upward force F on the tap 19 allows the clutch plate 18 to engage the intermediate member 9. Turning the tap 19 while the clutch plate 18 is so engaged rotates the intermediate member 9. This rotational motion of the intermediate member 9 is converted to axial translational motion of the valve plunger 16 as described above. In this manner, the arrangement of the tap 19 and clutch plate 18 may, upon axial displacement of the tap, selectively convert rotational motion of the tap to axial motion of the plunger between the closed position and the open position.

In some embodiments, a feature such as a key-way may be provided on the external surface of the plunger 16 and the internal surface of the valve body 15 to prevent rotation of the plunger.

To enable the device to be used in other orientations wherein the tap 19 does not necessarily extend downwardly, a spring might be provided between the clutch plate 18 and the intermediate member 9 to bias the clutch plate away therefrom.

In addition to swimming pools, the valve disclosed herein can be used with spa pools, spa baths, or other applications requiring water-filtration or childproof valve.

A valve unit for use in regulating a flow of water between a swimming pool having a sidewall and an opening, and a water filter unit. The valve unit comprising a valve body having an inlet portion and an outlet portion. The inlet portion is in close proximity to the outlet portion to form a passage way. The inlet and outlet portions are adapted for fluid communication with the opening of the sidewall and the water filter unit. The valve unit further comprises a plunger member moveable within the passage way to close and open the passage way. The valve unit further comprises a clutch member disposed outside the passage way and engageable with the plunger member. The valve unit further comprises a tap member engaged with the clutch member. In operation, axial displacement and rotational engagement of the tap member with the clutch member causes movement of the plunger member between the closed and open positions whereby the flow of water is restricted and unrestricted, respectively, between the swimming pool and the water filter unit. The valve unit may further comprise a pipe member having an inner end portion engaged with the inlet portion of the valve body and an outer end portion adapted to pass thru the opening in the sidewall of the swimming pool.

What is claimed is:

1. A valve unit for use in regulating a flow of water between a swimming pool having a sidewall and an opening, and a water filter unit, the valve unit comprising:

- a valve body having an inlet portion and an outlet portion; said inlet portion being in close proximity to said outlet portion to form a passage way; said inlet and outlet portions being adapted for fluid communication with the opening of the sidewall and the water filter unit, respectively;
- a plunger member moveable within said passage way to close and open said passage way;
- a clutch member disposed outside said passage way and engageable with said plunger member;
- a tap member engaged with said clutch member; and
- axial displacement and rotational engagement of said tap member with said clutch member causes movement of said plunger member between said closed and open positions whereby the flow of water is restricted and unrestricted, respectively, between the swimming pool and the water filter unit.

2. The valve unit of claim 1, further comprising a pipe member having an inner end portion engaged with said inlet portion of said valve body and an outer end portion adapted to pass thru the opening in the sidewall of the swimming pool.

3. The valve unit of claim 2, wherein said plunger member comprises an intermediate portion disposed outside said passage way and having a plurality of radially extending slots.

4. The valve unit of claim 3, wherein said clutch member comprises a plurality of radially extending arms adapted to engage with said plurality of radially extending slots.

5. The valve unit of claim 4, wherein said plunger member comprises at least one thread portion disposed within said passage way.

6. The valve unit of claim 5, further comprising a safety screen engaged with the outer end portion of said pipe member.

* * * * *